May 17, 1949.　　　　W. A. ANDERSON　　　　2,470,677
SYNCHRONOUS REGENERATOR

Filed June 18, 1947

INVENTOR.
WARREN A. ANDERSON
BY
H. G. Grover
ATTORNEY

Patented May 17, 1949

2,470,677

UNITED STATES PATENT OFFICE 2,470,677

SYNCHRONOUS REGENERATOR

Warren August Anderson, Nutley, N. J., assignor to Radio Corporation of America, a corporation of Delaware Application June 18, 1947, Serial No. 755,447

6 Claims. (Cl. 178—70)

1

This invention relates to a synchronous regenerator and more particularly to an improved device for reforming or regenerating received telegraph signals.

In the field of synchronous telegraphy, it has long been the practice to shape or reform the received signal prior to its utilization. Several schemes have been utilized, one of which is shown in United States Patent No. 2,359,649, granted to Kahn and Anderson, October 3, 1944. In so far as applicant is aware, all of the prior art approaches to the problem are dependent upon the selection of a small portion of the signal and utilizing that portion as a reference point to regenerate the signals. These methods have proven quite satisfactory provided that the signal is not distorted at the instant of selection of the reference point.

Two types of distortion in the received signals give rise to erroneously regenerated signals when using the prior art systems. The first of these is a signal "split", occuring when, during the reception of a mark element of the signal, the received power drops to a value insufficent to energize the receiving apparatus. Although such "splits" may occur for only a fraction of a second, if the occurrence is at the time of selection, a wrong character will be regenerated.

The second of the aforementioned types of distortion is a "fill," occuring when, during the reception of a space element of the signal, power is received which is strong enough to energize the receiving apparatus. Here again, the occurrence may last for only a fraction of the signal element, but if it occurs during the instant of selection a wrong character will be regenerated.

Accordingly, it is an object of this invention to provide an improved signal regenerator which will accurately regenerate received signals despite distortions therein.

It is a further object of this invention to provide an improved device of the character described which will be relatively simple in operation and which may be easily added to existing equipment.

Briefly, in accordance with the invention, the energy storage facilities of condensers, in conjunction with a synchronously driven telegraph distributor and a vacuum tube locking circuit, are utilized to measure the energy content, "mark" or "space," of each unit interval of a received signal throughout the full interval length and to regenerate the signal in accordance with the prevailing nature of the element.

2

By unit interval is meant the time length of the shortest unit in the code under consideration. Thus, in the Morse code, the unit interval would be the time length of a dot.

The above and other object and advantages of the invention will become apparent upon a consideration of the following detailed description when taken in conjunction with the accompanying figures, in which.

Figure 1:
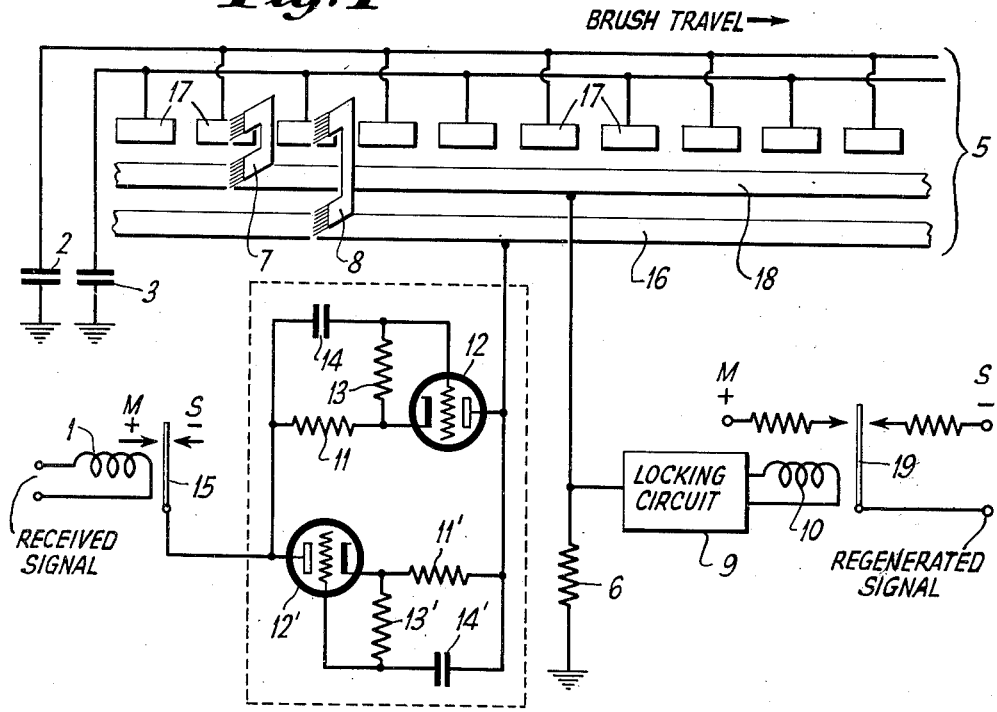
Fig. 1 is a schematic diagram of a preferred embodiment of the invention.

Referring to Fig. 1, it will be seen that the received signal is fed to the coil of line relay 1. The line relay 1 is provided with an oscillating tongue 15 arranged to complete a circuit to a positive source of potential during the reception of mark elements and to complete a circuit to a negative source of potential during the reception of space elements. The oscillating tongue 15 of the line relay 1 is arranged to connect these potentials through a constant current impedance device represented within the block 4 to a continuous commutator bar 16 on the distributor 5. The commutator bar 16 and a series of commutator segments 17 are bridged by a shorting brush 8. Every other one of the commutator segments 17 is connected to one side of a condenser 3. The remaining commutator segments 17 are connected to one side of a similar condenser 2. The other sides of each of the condensers 2 and 3 are connected at ground potential.

There is also provided on the distributor 5, a continuous commutator bar 18. A shorting brush 7 spans the commutator bar 18 and the commutator segments 17. In practice, the brush 7 would be arranged to sweep the commutator segments 17 exactly one baud interval later than brush 8.

Commutator bar 18 is connected to a discharge impedance shown as a resistor 6. The other side of the resistor 6 is connected at ground potential.

Connected so as to be energized by the potentials which appear across the resistor 6 is a regenerating locking circuit represented by the block 9. Such circuits are well known in the art and may be of any desired type. One such circuit is shown in U. S. Patent No. 2,264,510, granted December 2, 1941, to John W. Cox. The output of the locking circuit 9 is arranged to energize a relay 10 provided with an oscillating tongue 19 which will connect the signal output in acordance with the energization of the locking circuit 9 to a source of positive potential indicative of mark elements and to a source of negative potential indicative of space elements.

The device shown within the block 4 has been referred to as a constant current impedance. In other words, a device that passes constant current irrespective of the voltage drop across it. Such a device, of course, exists only in theory. The vacuum tube arrangement shown within the block 4 is an approach to this theoretical ideal.

The device is built in two halves, one reversed with respect to the other. That has been done to provide for the conduction of current in both directions. Since the operation of each half is identical only one side will be described. Corresponding parts in each half have been given similar numbers, with the execption of the fact that corresponding part numbers are primed in one of the halves of the device.

The circuit is arranged so that the tubes are normally operative at zero bias. However, the sudden flow of current through resistor 11 at the appropriate transition of the line relay 1 biases the tube until condenser 14 can charge through resistor 13 to the voltage across resistor 11. The rate of change of grid to cathode voltage is in opposition to the rate of change of plate voltage. Consequently, the current that flows through tube 12 tends to remain constant despite extremely wide plate voltage.

Figure 2:
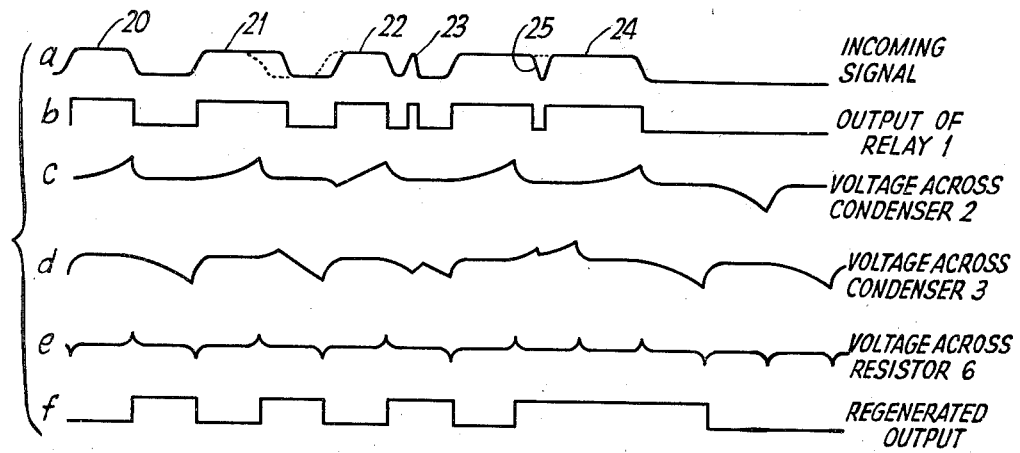
Fig. 2 is a series of curves illustrative of the operation of the invention in the presence of various types of distortion in the incoming signals.

The operation of the device may best be understood from a consideration of Fig. 2. For purposes of illustration, it has been assumed that the incoming signal corresponds to the letter V, which in the Morse code is represented by three dots and a dash.

Line $a$ represents the incoming signal to be regenerated. The first dot 20 has been shown in its proper length as has the interval between it and the next dot of the coded character. The second dot 21 has been shown as being elongated at the trailing edge, extending into a portion of the succeeding space element. The third dot 22 has been shown as starting late but ending at the proper time. The following space element has indicated therein a "fill" 23, such as might be caused by some atmospheric distrubance or the like. The dash 24 has been shown as covering the proper interval but contains a "split" 25. The dotted portions of curve $a$ are representative of an undistorted signal.

Line $b$ represents the action of the line relay 1. It will be seen that the tongue 15 of the relay follows exactly the incoming signal including the "splits" and "fills."

Line $c$ represents the voltage across condenser 2. As the brushes 7 and 8 sweep across their corresponding commutator bars 16 and 18 and the commutator segments 17, this condenser is alternately charged and discharged. The sense in which the condenser is charged is dependent upon the position of the oscillating tongue 15 of the line relay 1. Since the brushes 7 and 8 are rotating in synchronism with the transmitting apparatus, the discharge of condenser 2 will occur at equal intervals of baud length and will be in a sense which is equal to the predominating state of the received signals during the baud interval during which the condenser was charging. Thus, the appearance of a distortion such as a "fill" 23 or a "split" 25, while reducing the value to which the condenser is charged will not change the sense in which it has been charged.

Line $d$ represents the charging and discharging of condenser 3. It will be clear that condenser 3 is charged and discharged similarly to the charging and discharging of condenser 2 with the exception that the cycle is repeated a single baud later.

Line $e$ represents the voltages which are developed across resistor 6 by the discharges of condensers 2 and 3. As will be apparent, the condensers are rapidly discharged. These discharges appear as pulses of voltage which are applied to the locking circuit 9. The sense of these pulses will be dependent upon and in accordance with the sense in which the condensers 2 and 3 were charged.

Line $f$ represents the regenerated signal output produced by the action of relay 10.

It will be seen that there has thus been provided an apparatus which will faithfully and accurately regenerate received signal intelligence regardless of the occurrence of splits and fills. The device will accurately reproduce the signals to a point where only 50 percent of the received signal is correctly received. Furthermore, this 50 percent does not have to occur over any particular portion of the signal element.

Although the invention has been described with particularity, it is to be understood that the particular apparatus shown and described has been chosen for purposes of illustration only and not by way of limitation. Other devices and methods of carrying out the invention will occur to those skilled in the art and are to be contemplated as falling within the scope of the invention.

Having described my invention, what I claim is:

1. Electrical apparatus comprising, in combination, a source of signal intelligence, composed of mark and space elements, means actuated under the control of said signal intelligence for producing a first reference potential during said mark elements and a second reference potential during said space elements, a plurality of charging devices, an impedance device, means for alternately and cyclically at unit interval frequency charging said devices by said potentials at a constant current rate and discharging said devices through said impedance, the charging of said devices taking place over substantially the entire unit interval, and means for producing regenerated signals in accordance with potentials developed across said impedance.

2. Electrical apparatus comprising, in combination, a source of signal intelligence, composed of mark and space elements, means actuated under the control of said signal intelligence for producing positive potentials during said mark elements and negative potentials during said space elements, a constant current impedance device energized by said potentials, a plurality of charging devices, an impedance device, means for alternately and cyclically at unit interval frequency charging said devices by said currents and discharging said devices through said impedance, the charging of said devices taking place over substantially the entire unit interval, and means for producing regenerated signals in accordance with potentials developed across said impedance.

3. Electrical apparatus comprising, in combination, a source of signal intelligence composed of mark and space elements, means actuated under the control of said signal intelligence for producing a first reference potential during said mark elements and a second reference potential during said space elements, a commutator, a plurality of segments on said commutator, a first charging device, connected to alternate ones of said segments, the other side of said first charging device being grounded, a second charging device connected to the others of said segments, the other side of said second charging device being grounded, an impedance device, said commutator alternately and cyclically at unit interval frequency charging said devices by said potentials at a constant current rate and discharging said devices through said impedance, the charging of said devices taking place over substantially the entire unit interval, and means for producing regenerated signals in accordance with potentials developed across said impedance.

4. Electrical apparatus comprising, in combination, a source of signal intelligence composed of mark and space elements generated at a constant unit interval frequency, a first relay actuated by said signal intelligence, a local source of direct current potential, contacts on said first relay arranged to switch to positive potential during mark elements and negative potential during space elements, a constant current impedance device energized by said potentials, a commutator, a plurality of segments on said commutator, a first condenser connected to alternate ones of said segments, the other side of said first condenser being grounded, a second condenser connected to the others of said segments, the other side of said second condenser being grounded, a first commutator bar connected to the output of said constant current device, a second commutator bar connected to a resistance, the other side of said resistance being grounded, a first brush arranged to sweep said segments at unit interval frequency and to complete a circuit between said segments and said first commutator bar, a second brush arranged to sweep said segments one unit interval later than said first brush and to complete a circuit between said segments and said second commutator bar, said brushes contacting said segments during substantially the entire unit interval, a locking circuit energized by potentials produced across said resistance, a second relay actuated by said locking circuit and a second source of direct current potential, a tongue on said second relay arranged to complete a circuit to the positive or negative terminal of said second source of potential in accordance with the energization of said locking circuit.

5. A method of regenerating signal intelligence comprising the steps of producing two reference potentials, one corresponding to mark elements of said signal intelligence and the other corresponding to space elements of said signal intelligence, alternately and cyclically at unit interval frequency charging by said potentials at a constant current rate throughout substantially an entire unit interval and discharging through an impedance a plurality of storage devices and utilizing the potentials produced by said discharges to regenerate said signal intelligence.

6. A method of regenerating signal intelligence comprising the steps of producing two reference potentials, one corresponding to mark elements of said signal intelligence and the other corresponding to space elements of said signal intelligence, charging a first storage device by said potentials at a constant current rate throughout substantially an entire unit interval, simultaneously discharging a second storage device through an impedance, discharging said first discharge device during the next unit interval, simultaneously charging said second storage device by said potentials at a constant current rate throughout substantially the entire unit interval repeating the charge-discharge cycle at unit interval frequency and utilizing the potentials produced by said discharges to regenerate said signal intelligence.

WARREN AUGUST ANDERSON.

REFERENCES CITED

The following references are of record in the file of this patent:

UNITED STATES PATENTS

| Number | Name | Date |
| --- | --- | --- |
| 1,689,263 | Vernam | Oct. 30, 1928 |
| 2,086,429 | Nielsen | July 6, 1937 |
| 2,370,685 | Rea et al. | Mar. 6, 1945 |
| 2,389,675 | Mathes | Nov. 27, 1945 |

FOREIGN PATENTS

| Number | Country | Date |
| --- | --- | --- |
| 271,155 | Great Britain | May 18, 1927 |

Disclaimer

2,470,677.—*Warren A. Anderson*, Nutley, N. J. SYNCHRONOUS REGENERATOR.
 Patent dated May 17, 1949. Disclaimer filed Dec. 5, 1951, by the
 assignee, *Radio Corporation of America*.
 Hereby enters this disclaimer to claim 6 of said patent.
 [*Official Gazette January 15, 1952.*]